US006978294B1

(12) United States Patent
Adams et al.

(10) Patent No.: US 6,978,294 B1
(45) Date of Patent: Dec. 20, 2005

(54) PEER-TO-PEER HOSTING OF INTELLIGENT FIELD DEVICES

(75) Inventors: Lloyd B. Adams, Bristol, RI (US); Alexander P. Johnson, Houston, TX (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/531,597

(22) Filed: Mar. 20, 2000

(51) Int. Cl.[7] .................... G06F 15/16; G06F 15/173

(52) U.S. Cl. .................... 709/217; 709/221; 709/222; 709/223; 709/224; 709/225; 709/226

(58) Field of Search .............................. 709/223, 224, 709/227, 217, 221, 222, 225, 226; 395/200.38, 395/200.75

(56) References Cited

U.S. PATENT DOCUMENTS

| 4,897,777 | A | | 1/1990 | Janke et al. |
| 5,131,092 | A | | 7/1992 | Sackmann et al. |
| 5,270,917 | A | | 12/1993 | Kimura ........................ 364/187 |
| 5,579,220 | A | | 11/1996 | Barthel et al. |
| 5,805,442 | A | | 9/1998 | Crater et al. |
| 5,877,966 | A | * | 3/1999 | Morris et al. ................... 716/4 |
| 5,903,455 | A | | 5/1999 | Sharpe, Jr. et al. |
| 5,927,398 | A | * | 7/1999 | Maciulewicz ................ 165/209 |
| 5,950,006 | A | | 9/1999 | Crater et al. |
| 5,956,487 | A | | 9/1999 | Venkatraman et al. |

(Continued)

FOREIGN PATENT DOCUMENTS

| EP | 0 825 506 A2 | 2/1998 | ......... G05B 19/418 |
| EP | 0 913 750 A1 | 5/1999 | ......... G05B 19/418 |
| JP | 09123422 | 5/1997 | ........... B41F 33/00 |

(Continued)

OTHER PUBLICATIONS

David Preston; "Internet Protocols Migrate to Silicon for Networking Device"; *Electronic Design* vol. 45, No. 8; pp. 87-90 and 92-94; Apr. 14, 1997; XP000730016; ISSN: 0013-4872.

(Continued)

*Primary Examiner*—Ario Etienne
*Assistant Examiner*—Sahera Halim
(74) *Attorney, Agent, or Firm*—Fish & Richardson P.C.

(57) ABSTRACT

Device configurations are stored in a system including at least two intelligent field devices (IFDs) connected by a communications connection. A configuration for a first IFD is stored in the first IFD, and a backup of the configuration for the first IFD is stored in at least one other IFD. Storing a configuration for the first IFD may include having the first IFD request a configuration from at least one other IFD using the communications connection, an IFD having a stored backup of the configuration for the first IFD transmitting the backup to the first IFD using the communications connection, and the first IFD receiving the transmitted backup and storing the received backup in the first IFD as the configuration for the first IFD. Storing a backup of the configuration for the first IFD may include having the first IFD transmit a backup of the configuration for the first IFD to at least one other IFD using the communications connection, and having the at least one other IFD receive and store the backup of the configuration.

52 Claims, 7 Drawing Sheets

U.S. PATENT DOCUMENTS

| | | | |
|---|---|---|---|
| 5,975,737 | A | 11/1999 | Crater et al. |
| 5,982,362 | A | 11/1999 | Crater et al. |
| 5,997,167 | A | 12/1999 | Crater et al. |
| 6,032,236 | A * | 2/2000 | Honda .......................... 711/162 |
| 6,080,207 | A * | 6/2000 | Kroening et al. ........... 717/172 |
| 6,298,377 | B1 * | 10/2001 | Hartikainen et al. ........ 709/223 |
| 6,317,701 | B1 * | 11/2001 | Pyotsia et al. .............. 702/188 |
| 6,336,142 | B1 * | 1/2002 | Kato et al. ................... 709/227 |
| 6,487,558 | B1 * | 11/2002 | Hitchcock ................... 707/200 |

FOREIGN PATENT DOCUMENTS

| | | | |
|---|---|---|---|
| JP | 11-184507 | 7/1999 | |
| WO | WO 98/26337 | 6/1998 | ......... G05B 19/042 |
| WO | WO 98/50834 | 11/1998 | ......... G05B 19/409 |
| WO | WO 98/53581 | 11/1998 | ........... H04L 29/06 |
| WO | WO 99/20075 | 4/1999 | ............ H04Q 9/00 |
| WO | 99/50726 | * 10/1999 | ............ H04Q 9/00 |

OTHER PUBLICATIONS

Peter L. Fuhr et al.; "Remote Interrogation and Control of Sensors via the Internet"; *Sensors and Systems;* pp. 25-30; 1995; XP002050471.

Richard V. Baxter, Jr., "Implementing Open Networking in a Motor Drive", Oct. 1, 1999, The Embedded Internet Workshop, San Jose, CA.

Examination Report, UK Patent Office, Sep. 18, 2003.

* cited by examiner

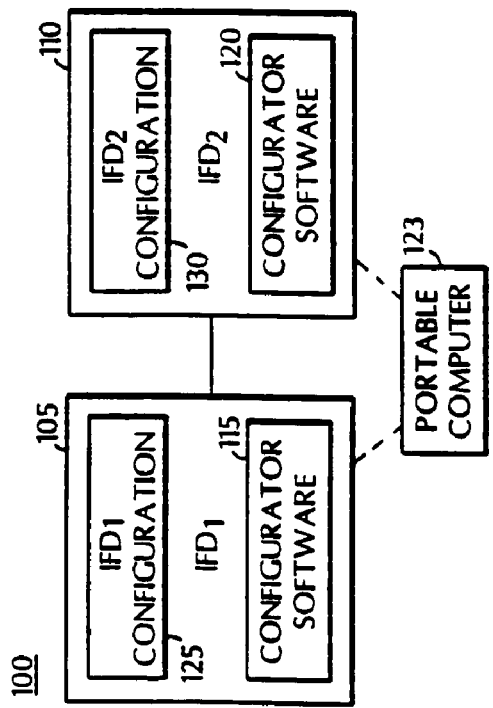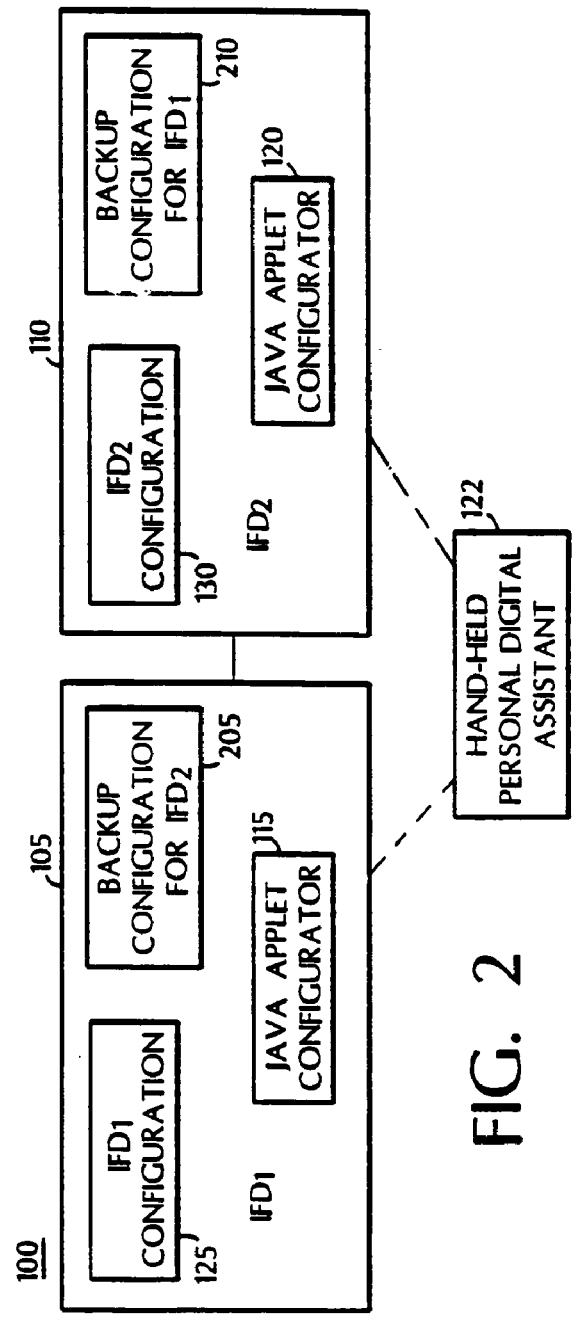

PEER-TO-PEER HOSTING OF INTELLIGENT FIELD DEVICES

BACKGROUND

Intelligent Field Devices (IFDs) are programmable hardware devices that are commonly used in industrial environments. Examples of IFDs include temperature sensors, pressure sensors, and valve positioners. In a typical industrial setting, there may be many independent IFDs, each of which has a configuration that is customized for the requirements of that IFD. A configuration includes instructions regarding the initial settings of the IFD and the manner in which the IFD will respond to anticipated events. Typically, the configuration of a particular IFD differs from configurations of other IFDs. A configuration can be updated as often as necessary to provide optimal IFD and system performance.

In one approach to configuring IFDs, a different configurator is used for each IFD. Typically, a configurator is a vendor-supplied, hand-held device that may be connected directly to an IFD.

Often, an IFD must recover its configuration due to a power loss, or after replacement due to device failure. A power loss may be planned, as when an IFD is taken out of service for maintenance, or unplanned, as when a power outage occurs. A common approach to recovery from a loss of power is to store the configuration data in non-volatile memory in the IFD. For large IFDs, it often is not practical to provide a sufficient amount of non-volatile memory within the device itself, due to size, speed, or cost constraints. Therefore, the configuration data for larger IFDs often are stored on a computer and downloaded to the IFD when needed.

When an IFD is replaced due to device failure, its configuration must be restored from outside the IFD. The most commonly used method for restoring configurations to an IFD is through a hand-held configurator. In particular, a hand-held configurator stores the configuration for a particular IFD on a removable medium, such as a memory pack. When that IFD is replaced, the corresponding configurator and memory pack are employed to reload the configuration onto the IFD.

A common alternative method for IFD configuration recovery is the use of a computer as a central configurator that stores all of the configurations. Typically, a portable computer is used for this purpose. To configure an IFD, the computer is connected to the IFD and the configuration is downloaded from the computer to the IFD. Often, for the sake of redundancy, a vendor provides both a hand-held configurator and a central configurator system using a portable computer.

SUMMARY

The invention is directed to storing device configurations in a system including at least two interconnected intelligent field devices (IFDs). At least two IFDs and a communications connection between them are provided. A configuration for a first IFD is stored in the first IFD, and a backup of the configuration for the first IFD is stored in at least one other IFD. The configuration for an IFD includes instructions regarding the initial settings of the IFD and the manner in which the IFD should respond to particular events.

Embodiments may include one or more of the following features. For example, storing a configuration for the first IFD may include having the first IFD request a configuration from at least one other IFD using the communications connection, having an IFD with a stored backup of the configuration for the first IFD transmit the backup to the first IFD using the communications connection, and having the first IFD receive the transmitted backup and store the received backup in the first IFD as the configuration for the first IFD. Additionally, storing a backup of the configuration for the first IFD may include having the first IFD transmit a backup of the configuration for the first IFD to at least one other IFD using the communications connection, and having the at least one other IFD receive and store the backup of the configuration.

In another implementation, storing a backup of the configuration for the first IFD includes having the first IFD transmit a backup of the configuration for the first IFD to at least one other IFD using the communications connection, and having the at least one other IFD receive and store the backup of the configuration.

In another implementation, storing a configuration for an IFD includes generating the configuration using a configurator program and storing the generated configuration. The configurator program may be stored in an IFD, possibly in the form of a Java applet. The configurator program may be accessed by using a Web browser, which may be stored in a device that is connected to the communications connection, thus enabling the Web browser to access the configurator program through the communications connection.

Alternatively, the Web browser may access the configurator program through a wireless connection between a device on which the Web browser is stored and an IFD. Such a wireless connection may be accomplished via an infrared connection, using, for example, a personal digital assistant or a portable computer.

In another implementation, the configurator program may itself be stored on a Web site. A Web browser may be used to access the configurator program, or an Internet gateway component may be used to access the configurator program by translating the Internet-compatible communications into a protocol being used by the IFDs. Likewise, a backup of the configuration for each IFD may be stored on a Web site, and either a Web browser may be used to access the backup configurations for each IFD, or an Internet gateway component may be used to access the backup configurations for each IFD by translating the Internet-compatible communications into a protocol being used by the IFDs.

Storing the backup of the configuration for the first IFD may include storing the backup in at least two other IFDs.

Each IFD may include one or more sensors for sensing a process condition or a mechanism for controlling a process condition.

The communications connection may include a two-wire connection between the IFDs. The method may further include providing operating power to at least one IFD through the two-wire connection.

The peer-to-peer hosting method provides several advantages. The first such advantage is the storage of a configurator within an IFD as a Java applet. This feature obviates the need to employ either a hand-held configurator for each IFD or a central configurator (i.e., a portable computer that contains all of the IFD configurations). This prevents confusion that may arise when associating a hand-held configurator with the IFD for which the hand-held configurator is designed. Because Java is platform-independent, it avoids any incompatibility that might otherwise arise between a hand-held configurator and an IFD. The use of a Java applet as a configurator also removes the need for multiple configurator devices. This reduces the cost of both the IFD vendor and the IFD customer because, at most, only one configurator device is needed. This also eliminates work associated with loading the configurator software onto each portable computer used as a central configurator or each hand-held configurator each time that a new IFD configuration is created.

Another advantage results from the use of peer IFDs to provide backup configurations for each other, and the use of an automatic configuration reload program. This is particularly important in the case of device failure and replacement, because the storage of the backup configuration enables the proper configuration to be loaded into the replacement device quickly and automatically. Because there is no need to locate a removable memory pack, problems associated with memory packs, such as swapping or mislabeling, are eliminated. The automation provided by this feature also enables a faster and less expensive configuration recovery, because there is no need to perform the manual operation of reloading the configuration with a hand-held device.

The Web browser connection feature provides two advantages. The first advantage is the ability to initialize all of the IFDs from a common source, as opposed to initializing each IFD from a separate hand-held configurator. The second advantage is the ability to archive the configurations in a single, easily accessed repository, such as a Web page maintained by a corporate IFD user. This allows them to be harvested at once and preserved in a safe location.

Other features and advantages will be apparent from the following description, including the drawings, and from the claims.

BRIEF DESCRIPTION OF THE DRAWINGS

FIG. 1 is a block diagram of a system for configuring Intelligent Field Devices (IFDs) using configurators that are resident on the IFDs and a portable computer.

FIG. 2 is a block diagram of a system for configuring IFDs using resident Java applet configurators and a hand-held personal digital assistant.

DETAILED DESCRIPTION

Figure 3:
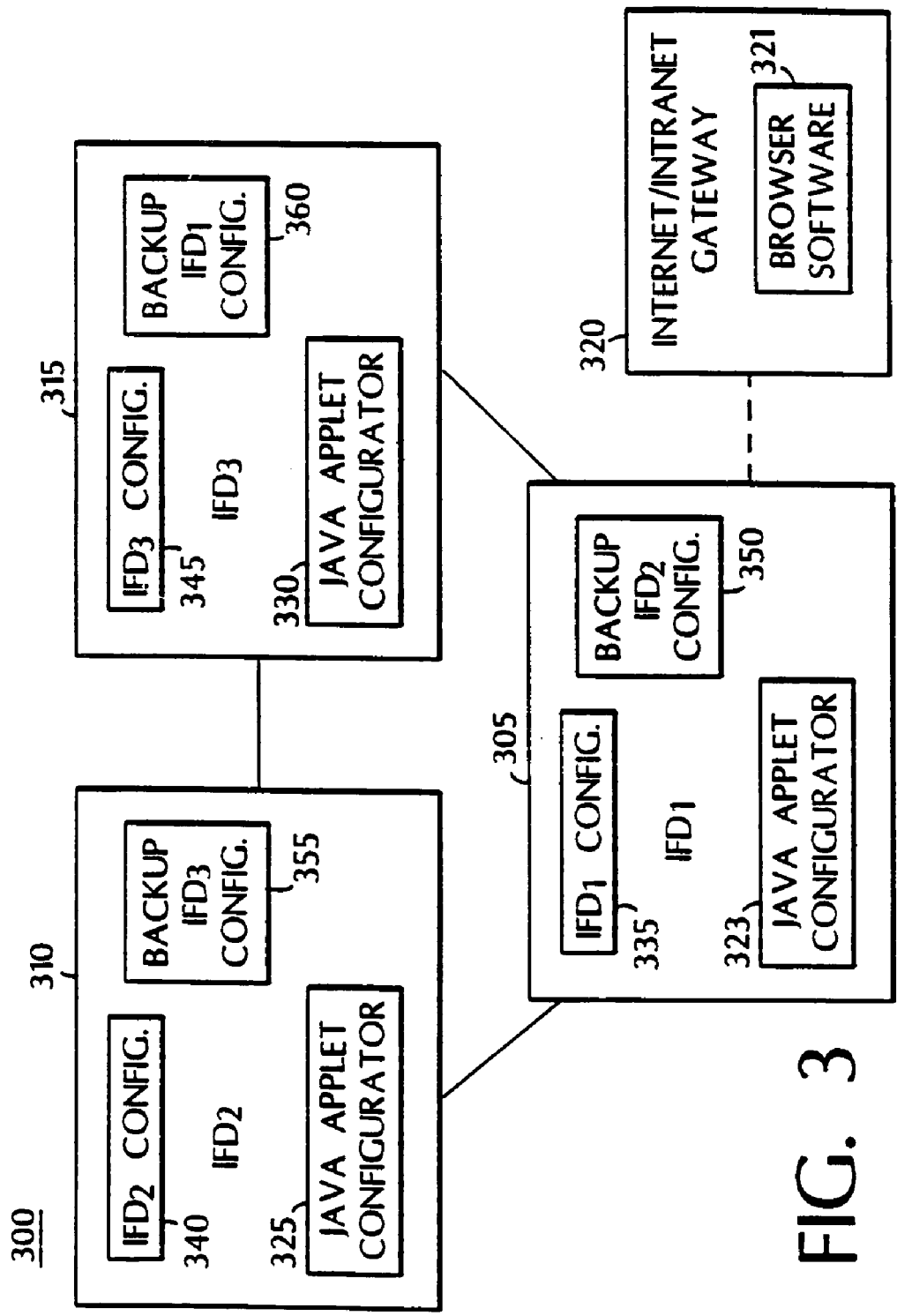
FIG. 3 is a block diagram of a system for configuring IFDs using resident Java applet configurators and an Internet/Intranet gateway connection.

Referring to FIGS. 1 and 2, a simple network 100 includes two IFDs, IFD1 105 and IFD2 110. It is noted that the system 100 can easily be adapted to include as many IFDs as desired. The network connections for the network 100 can be either direct electrical connections (i.e., wires) or wireless communications links.

The IFDs in the network use a vendor-selected protocol to format data for transmission to each other, as well as to other electronic devices in the network. Because of the industrial nature of the environments in which IFDs are typically used, some protocols are not designed for Internet access. Examples of such protocols commonly used in typical industrial environments include HART, FoxComm, PROFIBUS, and Foundation Fieldbus. However, in some cases, IFDs use Internet-compatible protocols such as TCP/IP and UCP/IP. In some implementations, one or more IFDs may support multiple protocols.

Typically, each IFD performs a sensing operation, a control operation, or both. IFDs that perform sensing operations, such as temperature sensors, pressure sensors, and flow meters, include one or more sensors for sensing process conditions. In addition to the sensors, these IFDs include transmitter circuitry for transmitting information about the process conditions to other devices.

IFDs that perform control operations, such as valve controllers, include one or more mechanisms for controlling process conditions. These IFDs often receive and use measurement signals provided by sensing IFDs. For example, a valve controller might control the position of a valve in response to a flow rate measurement provided by a flow meter. IFDs may include both sensors and mechanisms for controlling process conditions.

IFDs often are interconnected by two-wire connections. A two-wire connection may be used to provide a communications connection between the IFDs. Many IFDs also receive operating power from an associated two-wire connection.

A configurator program for IFD1 105 can be stored within IFD1 105 as a resident configurator software application 1 15 (e.g., a Java applet), and a resident configurator software application 120 for IFD2 110 can be stored within IFD2 110. These resident configurator applications can be accessed using a processor, such as, for example, a hand-held device 122 such as a personal digital assistant (e.g., a Palm III), or a portable computer 123, in communication with the IFD through, for example, a direct electrical connection or an infrared link. The configurator program of an IFD can be used to generate a configuration for the IFD. First, the processor downloads the configurator program from the IFD. The processor then runs the configurator program and generates a configuration file in response to inputs to the program from a user. Finally, the processor uploads the configuration file to the IFD, which stores the configuration in the memory of the IFD. Thus, a configuration 125 for IFD1 105 is stored in the memory of IFD1 105, and a configuration 130 for IFD2 110 is stored in the memory of IFD2 110.

In some implementations, each IFD can be programmed to store a backup version of its configuration on one or more peer devices. Thus, in the system of FIG. 2, a backup version 140 of the configuration for IFD1 105 is stored on IFD2 110, and a backup version 135 of the configuration for IFD2 110 is stored on IFD1 105. Typically, a backup configuration is generated each time an IFD's configuration is modified.

Each IFD also can be programmed to automatically check for the presence of a backup configuration at a peer IFD whenever it has lost power, either due to an outage or due to device failure and replacement. For example, upon power-up, an IFD might be programmed to broadcast a configuration request message identifying the IFD by network address and directed to all peer devices. An IFD having a backup configuration for the broadcasting IFD would respond by sending that backup configuration to the broadcasting IFD. The sending IFD also might include a backup copy of its own configuration for storage on the broadcasting IFD.

Referring to FIG. 3, a peer-to-peer hosting system 300 uses a network approach to interconnect three exemplary IFDs. Again, it is noted that the system 300 can easily be adapted to include as many IFDs as desired. IFD1 305, IFD2 310, and IFD3 315 are networked together and include associated Java applet configurators 323, 325, 330. A Java applet configurator can be used to configure each IFD, which then stores its own configuration in memory. Hence, IFD1 305 stores its own configuration 335 in memory, IFD2 310 stores its own configuration 340 in memory, and IFD3 315 stores its own configuration 345 in memory. Additionally, each of the three IFDs can store a backup version of another IFD's configuration. For example, IFD1 305 stores the backup configuration 350 for IFD2 310; IFD2 310 stores the backup configuration 355 for IFD3 315; and IFD3 315 stores the backup configuration 360 for IFD 1 305. Each IFD can also store software to automatically reload the respective backup configuration when necessary. In another implementation, an IFD may store backup configurations for multiple IFDs, and the backup configuration for an IFD may be stored on multiple IFDs.

Figure 4:
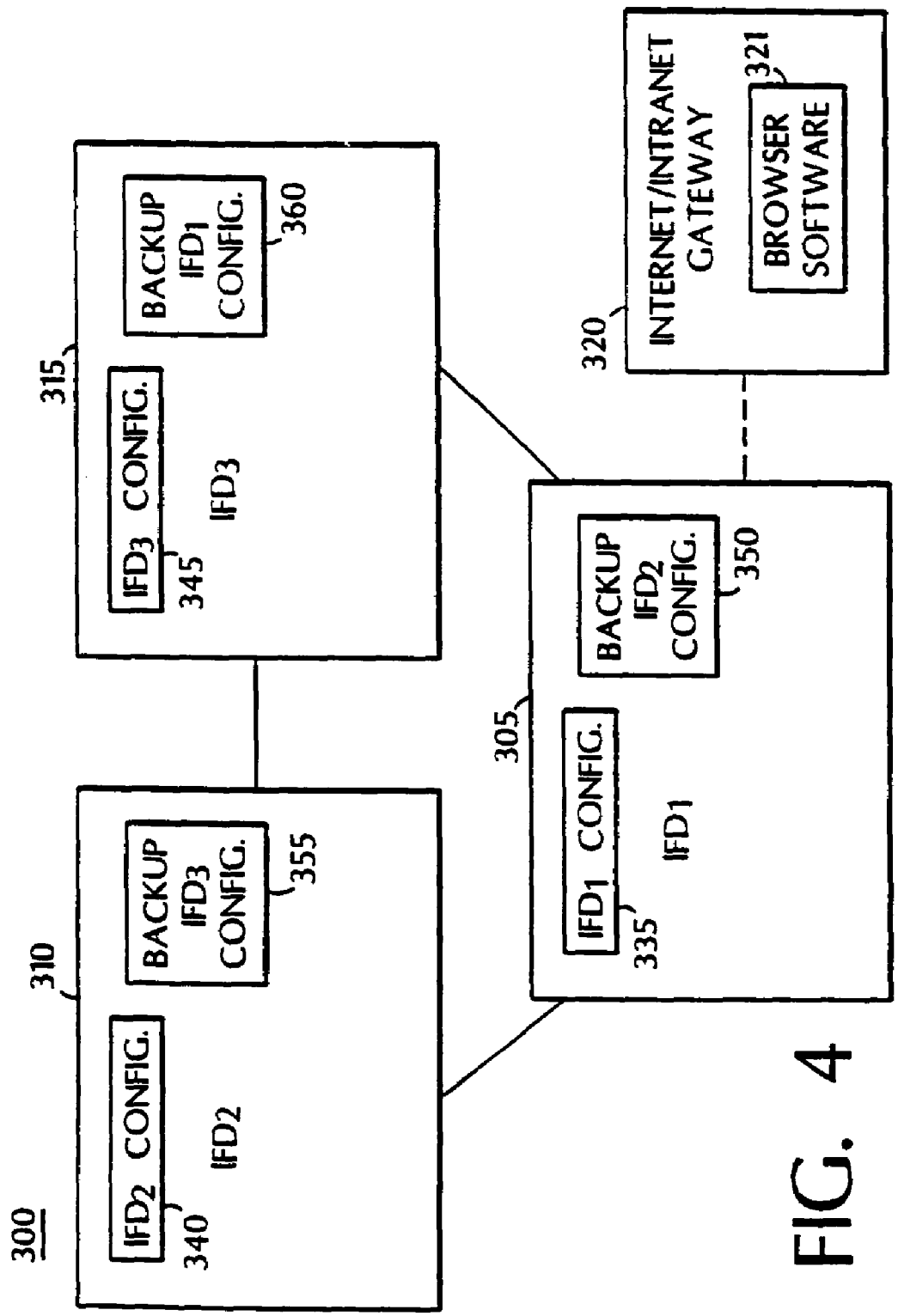
FIG. 4 is a block diagram of a system for configuring IFDs using a web server from either the Internet or an Intranet as a configurator.

The system 300 may also include a gateway connection 320 to either the Internet or a stand-alone local area network such as an Intranet. The gateway connection 320 may include browser software 321 for browsing network web sites, such as web sites that may be found on the World Wide Web. The Internet/Intranet gateway 220 can be connected to any IFD on the network. In FIG. 3, the Internet/Intranet gateway 320 is connected to IFD1 305. In some implementations, the Internet/Intranet gateway 320 may provide access to the World Wide Web, thus allowing any web site that contains IFD configuration information to be visited. A web site may even be developed specifically for the purpose of storing and/or supplying IFD configurations. In this manner, a web server can act as a configurator. Referring also to FIG. 4, the use of a web site as a configurator allows this approach to be used in implementations in which the IFDs do not use resident configurator software.

The Internet/Intranet gateway 320 can be used to perform the initial generation of an IFD configuration, which may be required when a new IFD is introduced into the system, when an existing IFD requires an update to its configuration, or when a power outage or other event affects all of the IFDs so that they all require configuration reloading. In some implementations, the ability to access the Internet via Web browser software 321 provides system redundancy for configurators as well as backup versions of specific configurations.

Figure 5:
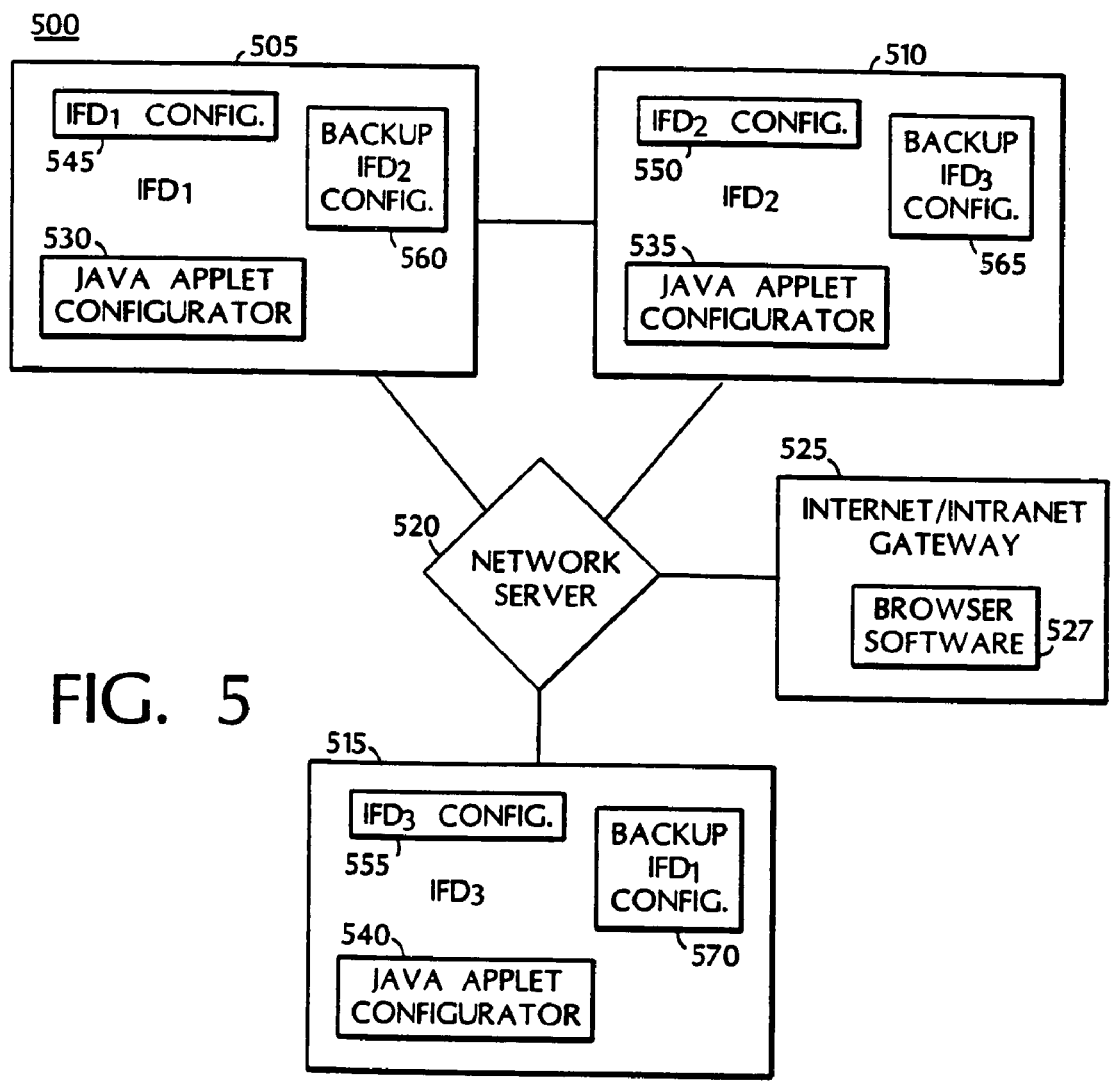
FIG. 5 is a block diagram of a system for configuring IFDs using a network-based approach.

Referring to FIG. 5, another implementation of a peer-to-peer hosting system 500 uses a network-based approach. The system 500 includes three exemplary IFDs: IFD1 505, IFD2 510, and IFD3 515. Again, the system 500 can easily be adapted to include as many IFDs as desired. The system 500 also includes a network server 520 with a permanent Internet/Intranet gateway connection 525, including browser software 527. This arrangement provides a robust network design, much like a typical local area network (LAN) or wide area network (WAN). In the system 500, the Internet/Intranet gateway connection 525 allows the configurations to be restored via the gateway 525 for any contingency, so that the configurations can be restored either via the gateway 525 or via the backup configurations 560, 565, 570 stored on corresponding peer devices. Additionally, the backup configurations may be stored on the network server 520, thus providing a third possible source for restoring configurations.

Figure 6:
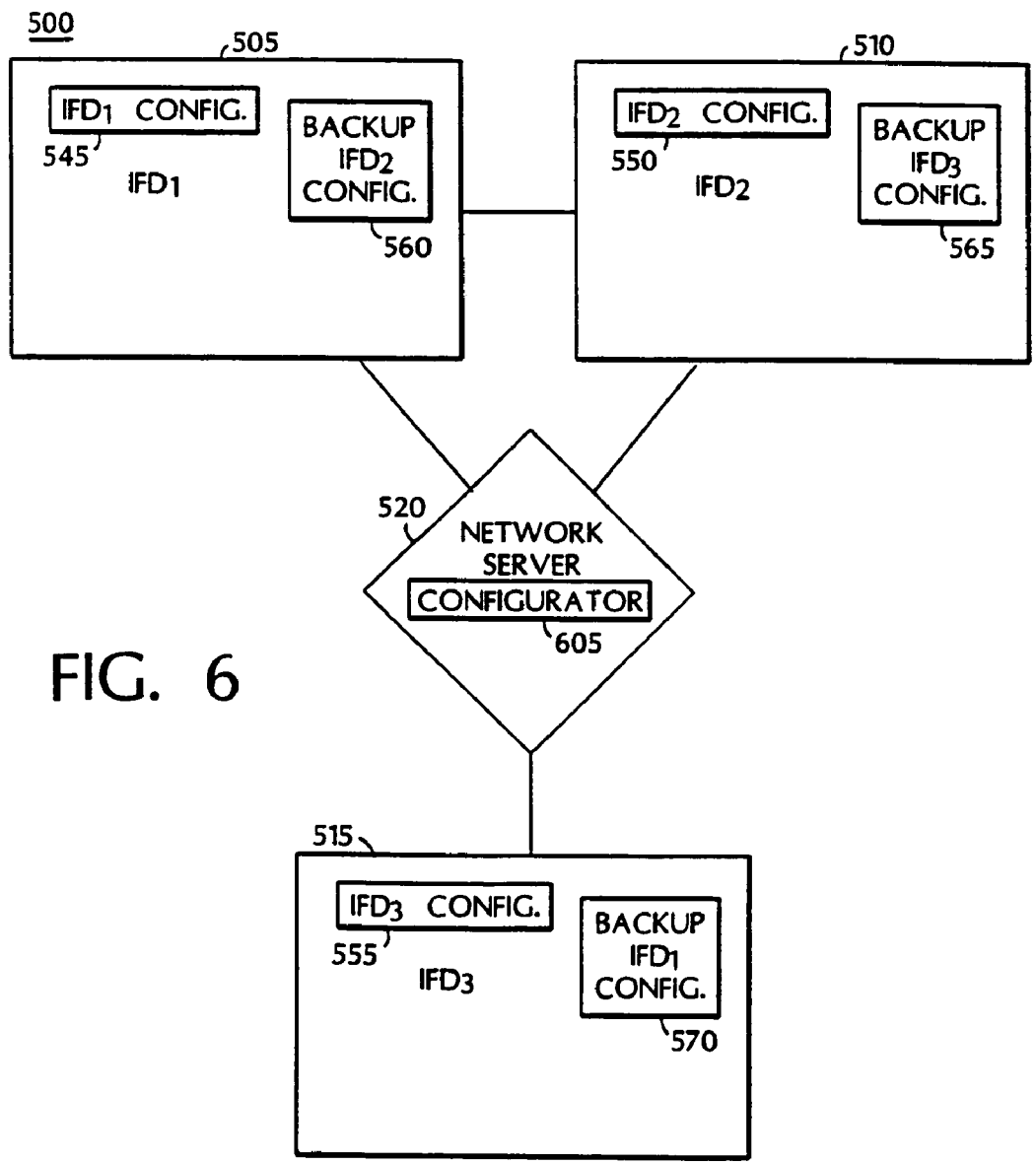
FIG. 6 is a block diagram of a system for configuring IFDs using a network-based approach in which the configurator is resident on the network server.

Referring to FIG. 6, in a variation of the implementation illustrated in FIG. 5, the system 500 may still use a network-based approach, but, because it uses an industrial protocol that supports peer-to-peer functionality but is not designed for use with the Internet, such as Foundation Fieldbus or PROFIBUS, there is no gateway connection 525. Despite this, the network-based approach still provides the ability to restore the IFD configurations either from the backup versions on corresponding peer devices via the network server 520, or directly from the network server 520 itself.

This implementation also functions in the absence of resident Java applet configurators by using a configurator 605 that is contained within the network server 520. Once again, system redundancy for both the configurator function and the backup of specific individual configurations is provided, in this instance via the network server 520 and its associated configurator 605.

Figure 7:
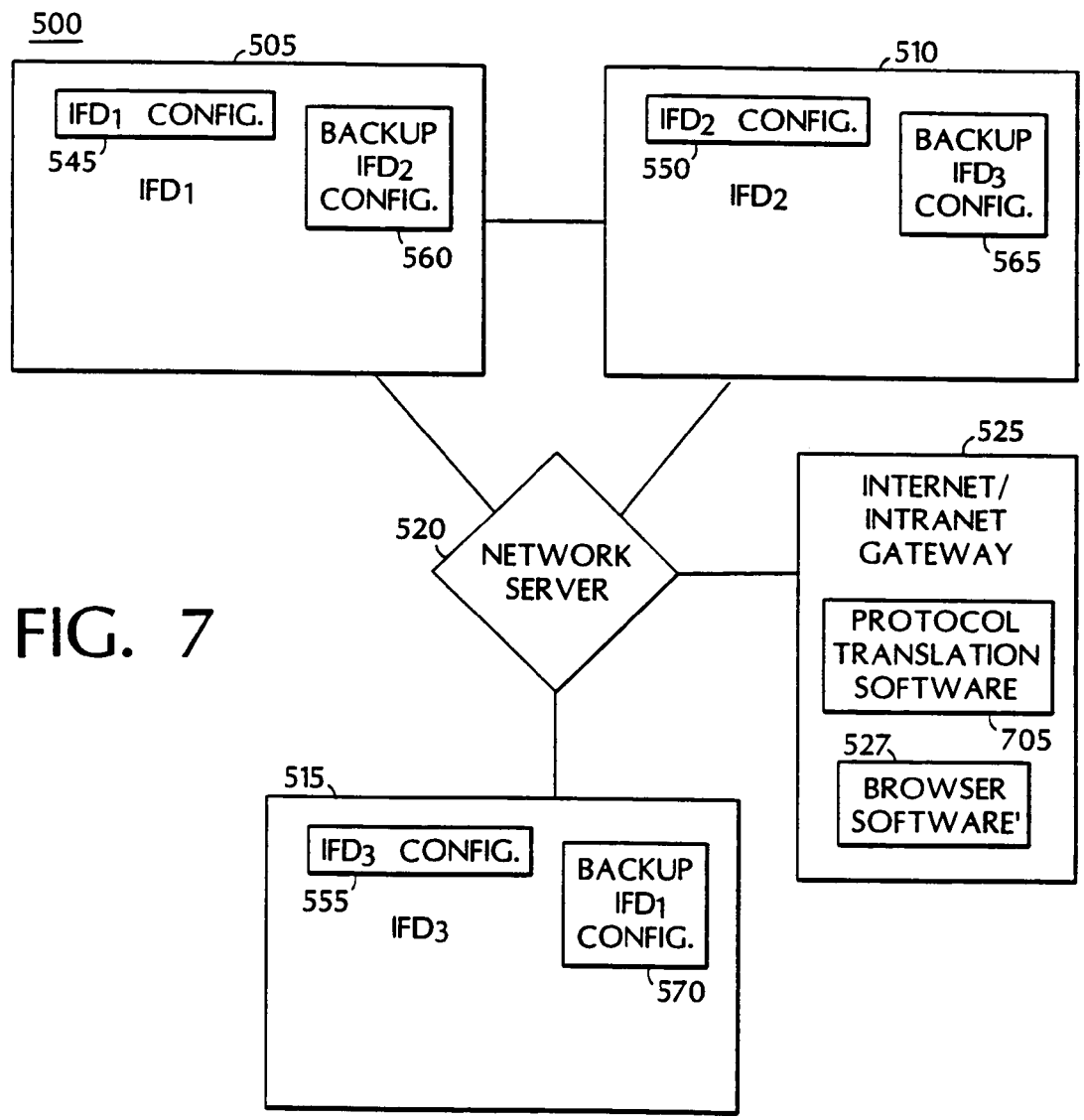
FIG. 7 is a block diagram of a system for configuring IFDs using a network-based approach in which an Internet/Intranet gateway provides a conversion to enable compatibility with non-internet industrial protocols.

Referring to FIG. 7, in another variation of the implementations illustrated in FIGS. 5 and 6, the system 500 may still use a network-based approach while using an industrial protocol that is not designed for use with the Internet, such as HART, FoxComm, Foundation Fieldbus, or PROFIBUS. Instead of direct access to the Web via browser software 527, the gateway connection 525 contains protocol translation software 705 that translates communications between an Internet-compatible protocol and the local industrial protocol. This variation thus provides the ability to use the Internet as either a configurator or to store backup configurations even when the local protocol does not support Internet communications.

Referring to FIGS. 6 and 7, another variation allows the network-based approach to be used even if the local industrial protocol (e.g., HART or FoxComm) does not support peer-to-peer functionality. Thus, in this variation, backup configurations are not stored on peer IFDs. However, configurations can still be provided or restored either by using configurator software 605 that is resident on the network server 520, as shown in FIG. 6, or by using configurator software stored on a web server and accessed via the gateway connection 525, the protocol translation software 705, and the browser software 527, as shown in FIG. 7.

Figure 8:
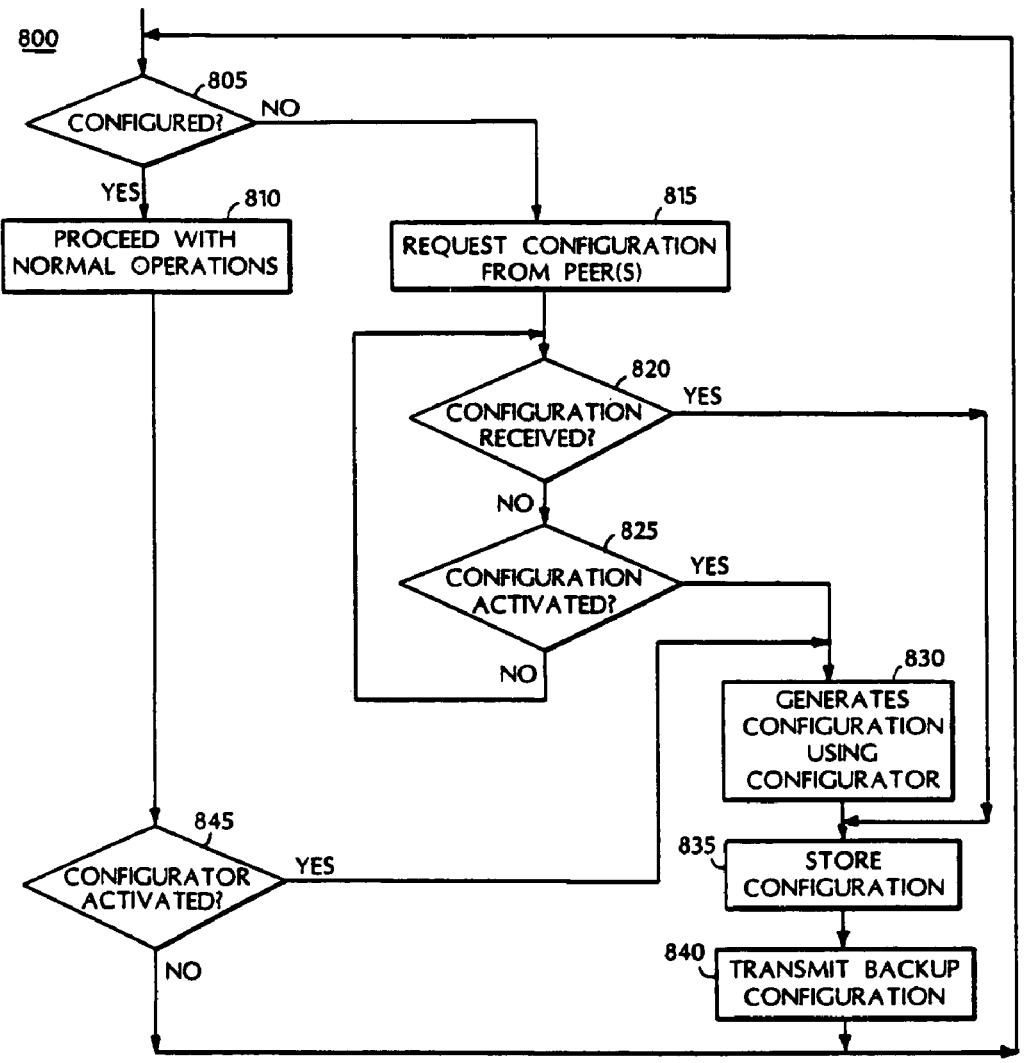
FIG. 8 is a flowchart of a peer-to-peer hosting method for configuring IFDs.

Referring to FIG. 8, an IFD in a system using the peer-to-peer hosting method may operate according to a procedure 800. Initially, the IFD checks whether it is configured (step 805). If the IFD is configured, the IFD proceeds with normal operations (step 810). The IFD continues with normal operations until a failure, activation of the configurator, or some other event causes the IFD to cease normal operations.

If the IFD is not configured, the IFD will request a copy of its configuration from one or more peer devices (step 815). The request may be directed, for example, to a particular peer IFD, the identity of which is pre-loaded in the IFD. The request also may be a broadcast request directed to all peer IFDs.

In general, an IFD will receive a configuration from a peer IFD when the IFD has previously lost its configuration due to device failure or replacement, or due to a localized loss of power. When an IFD is connected to the network for the first time, there will not be a backup configuration available for that IFD. However, in some implementations, the IFD may still receive a configuration from a peer IFD. For example, a system may employ a standard configuration for a certain class of IFDs (e.g., pressure sensors), and the IFD may receive a configuration for the class to which it belongs.

If the IFD does not immediately receive a copy of its configuration (step 820), the IFD checks to see whether its configurator has been activated (step 825). The configurator may be activated, for example, by a Web browser connected to the IFD or the network including the IFD, by a hand-held device or computer connected to the IFD, or by manipulation of a button or switch mounted on the IFD.

If the configurator has been activated, the IFD generates a configuration using the configurator (step 830). After the configuration is generated, the IFD stores the configuration (step 835) and transmits a backup copy of the configuration to one or more other IFDs (step 840). The IFD then confirms that the configuration is complete (step 805) and begins normal operations (step 810).

If the configurator has not been activated (step 825), the IFD cycles through a loop that checks for receipt of a configuration (step 820) or activation of the configurator (step 825). The IFD continues to do this until one of these events occurs.

If a configuration is received from a peer IFD (step 820), the IFD stores the configuration (step 835). Storage of the configuration may include storage of a backup configuration for the peer IFD transmitted by the peer IFD along with the requested configuration. After storing the configuration, the IFD may optionally transmit a backup copy of its configuration for storage at one or more peer IFDs (step 840). The IFD then confirms that the configuration is complete (step 805) and begins normal operations (step 810).

Upon completion of normal operations, the IFD checks to see if the configurator has been activated (step 845). If so, the IFD generates a revised configuration using the configurator (step 830) and proceeds as discussed above. If not, the IFD verifies that it is still configured (step 805) and proceeds accordingly.

Other embodiments are within the scope of the following claims.

What is claimed is:

1. A method of operating an intelligent field device (IFD), the method comprising:
    providing a first IFD assigned a first operation, wherein the first IFD is a processing device for use in industrial environments;
    providing a second IFD assigned a second operation, wherein the second IFD is a processing device for use in industrial environments, the second IFD storing a first configuration for use by the first IFD in performing the first operation and storing a second configuration for use by the second IFD in performing the second operation;
    transferring the first configuration from the second IFD to the first IFD; and
    performing the first operation using the first IFD with the first configuration transferred from the second IFD to the first IFD.

2. The method of claim 1, wherein transferring the first configuration from the second IFD to the first IFD comprises:
    the first IFD sending a request for the first configuration to the second IFD using a communications connection between the first IFD and the second IFD;
    the second IFD receiving the request for the first configuration from the first IFD; and
    in response to the request for the first configuration received from the first IFD, the second IFD sending the first configuration to the first IFD using the communications connection.

3. The method of claim 2 further comprising:
    the first IFD transmitting the first configuration to at least one other IFD; and
    the at least one other IFD receiving and storing the first configuration as a backup.

4. The method of claim 1 further comprising:
    the first IFD transmitting the first configuration to at least one other IFD; and
    the at least one other IFD receiving and storing the first configuration as a backup.

5. The method of claim 1 wherein the configuration includes instructions regarding the initial settings of the IFD and the manner in which the IFD should respond to particular events.

6. The method of claim 1 further comprising generating the first configuration using a configurator program.

7. The method of claim 6, wherein the configurator program is stored in the first IFD.

8. The method of claim 7, wherein the configurator program comprises a Java applet.

9. The method of claim 7, further comprising accessing the configurator program using a Web browser.

10. The method of claim 9, wherein the Web browser is not stored in the first IFD.

11. The method of claim 10, wherein the Web browser is stored in a device connected to a communications connection between the first IFD and the device, and the Web browser accesses the configurator program through the communications connection.

12. The method of claim 10, wherein the Web browser accesses the configurator program through a wireless connection between a device on which the Web browser is stored and the first IFD.

13. The method of claim 12, wherein the wireless connection comprises an infrared connection.

14. The method of claim 12, wherein the device comprises a personal digital assistant.

15. The method of claim 12, wherein the device comprises a portable computer.

16. The method of claim 6, wherein the configurator program is stored on a Web site.

17. The method of claim 6, wherein a Web browser is used to access the configurator program.

18. The method of claim 6, wherein an Internet gateway component is used to access the configurator program by translating Internet-compatible communications into a protocol being used by the at least two IFDs.

19. The method of claim 1 further comprising determining that the first configuration is not stored in the first IFD such that transferring the first configuration from the second IFD to the first IFD comprises transferring the first configuration from the second IFD to the first IFD in response to the determinination that the first configuration is not stored on the first IFD.

20. The method of claim 1, wherein the first operation is a sensing operation or a controlling operation.

21. The method of claim 1, further comprising providing a two-wire communications connection between the first IFD and the second IFD.

22. The method of claim 21, further comprising providing operating power to at least the first IFD through the two-wire communications connection.

23. The method of claim 1 further comprising:
    accessing, with an external processor, a configurator program stored on the first IFD;
    running the configurator program on the external processor to generate the configuration;
    transmitting the configuration to the first IFD; and
    storing the configuration in memory in the first IFD.

24. The method of claim 23, wherein the configurator program comprises a Java applet.

25. The method of claim 23, wherein the external processor comprises an external computer.

26. The method of claim 23, wherein the external processor comprises a hand-held device.

27. The method of claim 1 further comprising:
accessing a configurator program using browser software, wherein the configurator program is stored on a distributed network site;
running the configurator program to generate the configuration; and
storing the configuration in memory in the first IFD.

28. The method of claim 27, wherein the distributed network site comprises a World Wide Web site.

29. The method of claim 27, further comprising translating communications between a first protocol used by the distributed network site and a second protocol used by the first IFD.

30. The method of claim 1 wherein transferring the first configuration from the second IFD to the first IFD comprises transferring the first configuration from the second IFD to the first IFD using a portable device.

31. The method of claim 1 wherein transferring the first configuration from the second IFD to the first IFD comprises transferring the first configuration from the second IFD to the first IFD using a communications connection between the first IFD and the second IFD.

32. A network of intelligent field devices, the network comprising:
a first IFD assigned a first operation, wherein the first IFD is a processing device for use in industrial environments;
a second IFD assigned a second operation, wherein the second IFD is a processing device for use in industrial environments, the second IFD storing a first configuration for use by the first IFD in performing the first operation and storing a second configuration for use by the second IFD in performing the second operation; and
a communications connection between the first IFD and the second IFD;
wherein the first IFD:
sends a request for the first configuration to the second IFD through the communications connection;
receives the first configuration from the second IFD through the communications connection; and
performs the first operation using the first configuration received from the second IFD.

33. The device network of claim 32, wherein the first IFD is configured to transmit the first configuration to at least one other IFD using the communications connection, and the one other IFD is configured to receive and store the first configuration as a backup.

34. The method of claim 32 wherein the configuration includes instructions regarding the initial settings of the IFD and the manner in which the IFD should respond to particular events.

35. The device network of claim 32, further comprising a configurator operable to generate the configuration.

36. The device network of claim 35, wherein the configurator comprises a program stored in the first IFD.

37. The device network of claim 36, wherein the configurator program comprises a Java applet.

38. The device network of claim 36, wherein the configurator program is configured to be accessed using a Web browser.

39. The device network of claim 38, wherein the Web browser is stored remotely from the first IFD.

40. The device network of claim 39, wherein the Web browser is stored in a device connected to the communications connection and is configured to access the configurator program through the communications connection.

41. The device network of claim 39, wherein the Web browser is configured to access the configurator program through a wireless connection between a device on which the Web browser is stored and the first IFD.

42. The device network of claim 41, wherein the wireless connection comprises an infrared connection.

43. The device network of claim 41, wherein the device on which the Web browser is stored comprises a personal digital assistant.

44. The device network of claim 41, wherein the device on which the Web browser is stored comprises a portable computer.

45. The device network of claim 35, wherein the configurator program is stored on a Web site.

46. The device network of claim 35, wherein the configurator program is configured to be accessed using a Web browser.

47. The device network of claim 35, further comprising an Internet gateway component for use in accessing the configurator program by translating Internet-compatible communications into a protocol being used by the first IFD.

48. The device network of claim 32, further comprising a third IFD assigned a third operation, the third IFD storing the first configuration for use by the first IFD in performing the first operation and storing a third configuration for use by the third IFD in performing the third operation.

49. The device network of claim 32, wherein the first operation comprises a sensing operation or a controlling operation.

50. The device network of claim 32, wherein the communications connection comprises a two-wire connection between the IFDs.

51. The device network of claim 50, wherein the two-wire connection is connected to provide operating power to at least the first IFD.

52. An intelligent field device (IFD), which is a processing device for use in industrial environments, comprising:
at least one processor; and
a memory including instructions that, when executed by the processor, cause the intelligent field device to perform the following operations:
determine that a first configuration is not stored in a memory of the IFD, the first configuration for use by the IFD in performing a first operation assigned to the IFD;
in response to the determination that the first configuration is not stored in a memory of the IFD, send a request through a communications connection to a second IFD assigned a second operation, wherein the second IFD is a processing device for use in industrial environments, the second IFD storing the first configuration for use by the IFD in performing the first operation and storing a second configuration for use by the second IFD in performing the second operation;
receive the first configuration from the second IFD through the communications connection; and
perform the first operation using the first configuration received from the second IFD.

* * * * *